(12) United States Patent
Kuwelkar et al.

(10) Patent No.: US 9,894,006 B2
(45) Date of Patent: Feb. 13, 2018

(54) STREAM SHAPING IN AVB NETWORKS

(71) Applicant: Harman International Industries, Incorporated, Stamford, CT (US)

(72) Inventors: Heramb Kuwelkar, Fatorda Margao (IN); Lejin K. Joy, Bangalore (IN)

(73) Assignee: Harman International Industries, Incorporated, Stamford, CT (US)

( * ) Notice: Subject to any disclaimer, the term of this patent is extended or adjusted under 35 U.S.C. 154(b) by 108 days.

(21) Appl. No.: 14/562,523

(22) Filed: Dec. 5, 2014

(65) Prior Publication Data

US 2016/0164795 A1    Jun. 9, 2016

(51) Int. Cl.
H04L 12/00 (2006.01)
H04L 12/805 (2013.01)
H04L 29/06 (2006.01)

(52) U.S. Cl.
CPC ............ H04L 47/365 (2013.01); H04L 65/60 (2013.01)

(58) Field of Classification Search
CPC ...................................... H04L 47/39
See application file for complete search history.

(56) References Cited

U.S. PATENT DOCUMENTS

| | | | | |
|---|---|---|---|---|
| 2005/0047343 A1* | 3/2005 | Sharony | ................. | H04L 47/10 370/235 |
| 2006/0078001 A1* | 4/2006 | Chandra | ................. | H04L 12/46 370/473 |
| 2006/0209796 A1* | 9/2006 | Scott | ....................... | H04L 29/06 370/352 |
| 2006/0221875 A1* | 10/2006 | Trainin | ................... | H04L 12/56 370/282 |
| 2008/0267140 A1* | 10/2008 | Lee | ....................... | H04L 5/0007 370/337 |
| 2012/0030360 A1* | 2/2012 | Sanders | .................. | H04L 45/00 709/227 |
| 2012/0121034 A1* | 5/2012 | Murakami | ........ | H04L 25/03171 375/295 |
| 2012/0314597 A1* | 12/2012 | Singh | .................. | H04L 43/0882 370/252 |

(Continued)

OTHER PUBLICATIONS

IEEE Standards Association, IEEE Standard for Local and metropolitan area networks—Timing and Synchronization for Time-Sensitive Applications in Bridged Local Area Networks, Mar. 30, 2011, 292 pages.

(Continued)

*Primary Examiner* — John Blanton
(74) *Attorney, Agent, or Firm* — McCoy Russell LLP

(57) ABSTRACT

Embodiments are disclosed for a device for determining a number of sample blocks to include in a packet. In some embodiments, a device comprises a communication interface communicatively connectable to another device and configured to transmit data, a processor, and a storage device that stores instructions executable by the processor to determine a total sample size of samples stored in a transmission buffer. The instructions are further executable to calculate a bandwidth credit based on a reserved bandwidth and an elapsed time since a last sent packet, determine a number of sample blocks to include in a packet based on the total sample size and the bandwidth credit, and generate a packet including the determined number of sample blocks.

20 Claims, 6 Drawing Sheets

(56) References Cited

U.S. PATENT DOCUMENTS

2015/0146523 A1* 5/2015 Yang .................... H04L 45/306
370/230

OTHER PUBLICATIONS

IEEE Standards Association, IEEE Standard for Local and metropolitan area networks—Audio Video Bridging (AVB) Systems, Sep. 30, 2011, 45 pages.

IEEE Standards Association, IEEE Standard for Local and metropolitan area networks—Media Access Control (MAC) Bridges and Virtual Bridge Local Area Networks, Aug. 31, 2011, 1,365 pages (submitted in two parts).

IEEE Standards Association, IEEE Standard for Layer 2 Transport Protocol for Time-Sensitive Applications in Bridged Local Area Networks, May 6, 2011, 57 pages.

* cited by examiner

STREAM SHAPING IN AVB NETWORKS

FIELD

The disclosure relates to determining a number of sample chunks to be included in packets transmitted in an AVB network.

BACKGROUND

Audio Video Bridging (AVB) is a networking protocol pertaining to streaming audio and/or video data via a network (e.g., an Ethernet network), described in IEEE 802.1 standards (e.g., IEEE802.1BA-2011, IEEE 802.1Q-2011, IEEE 802.1AS-2011, etc.). An AVB network may include one or more talkers (e.g., transmitters) and one or more listeners (e.g., receivers) for transmitting and receiving audio/video data according to the Audio/video transport protocol (AVTP), described in the IEEE 1722-2011 standard.

SUMMARY

In an AVB network a source stream of data may be configured to carry data bytes at a specific rate. The rate may depend upon the rate at which the physical source (e.g., a source that provides the audio/video data to a talker of an AVB network) produces audio/video samples. A media rate (e.g., playback rate) may be met by transmitting an expected number of samples in each packet so that the listener has access to each sample when that sample is to be played back. The effect of sample not being sent as per the expected rate may be highly disruptive to a user experience, by producing undesirable effects such as audio distortion and/or variable audio playback rates.

The disclosure provides methods and systems for determining a count of sample chunks that a packet is able to carry in every single interval. The input parameters for determining such a count may include each stream specific reserved bandwidth, elapsed time, and number of sample chunks available to transmit during that interval. By calculating the count of sample chunks to be carried dynamically for every cycle and adjusting the count based on interval difference between current and previous cycle and bandwidth credited for the current cycle, a transmit rate may be maintained in accordance with media rate.

In some embodiments, a talker device for determining a number of sample blocks to include in a packet includes a communication interface communicatively connectable to another device and configured to transmit data, a processor, and a storage device that stores instructions executable by the processor to determine a total sample size of samples stored in a transmission buffer. The instructions are further executable to calculate a bandwidth credit based on a reserved bandwidth and an elapsed time since a last sent packet, determine a number of sample blocks to include in a packet based on the total sample size and the bandwidth credit, and generate a packet including the determined number of sample blocks.

In some embodiments, a communication system includes a talker device including a transmission buffer for storing audio/video data blocks for transmission, and a stream shaper module including instructions executable by a processor of the talker device to determine a number of sample blocks to include in a packet based on the total sample size of data blocks in the transmission buffer and a bandwidth credit and to generate a packet including the determined number of sample blocks. The communication system further includes a listener device communicatively connected to the talker device and configured to receive the generated packet from the talker device.

According to some embodiments, an example method for determining a number of sample blocks to include in packets of an audio/video stream transmitted from a talker device to a listener device may be performed. The example method includes determining a total sample size of data in a transmission buffer of a talker device, determining an elapsed time between a timestamp of a prior generated packet and a current timestamp, and calculating a total bandwidth credit based on a reserved bandwidth and the elapsed time. The example method further includes determining a number of sample blocks to be included in a packet based on the total bandwidth credit and the total sample size, and generating the packet including the determined number of sample blocks.

BRIEF DESCRIPTION OF THE DRAWINGS

The disclosure may be better understood from reading the following description of non-limiting embodiments, with reference to the attached drawings, wherein below.

DETAILED DESCRIPTION

As described above, a communication system may include talker and listener devices. The listener devices may receive audio/video streams from the talker devices and playback each received packet of the audio/video streams at a media rate (e.g., defined by a sample rate of the media). However, if the transmission rate of the talker does not accommodate the media rate, the audio playback may be disrupted by distortion, skipped samples, sped up/slowed down playback speeds, etc. In order to ensure that the listener is able to playback the audio/video data properly, the talker device may determine a number of sample chunks to be included in a packet at each packet generation interval. The determination of a sample chunk count for transmitted packets is described in more detail below.

Figure 1:
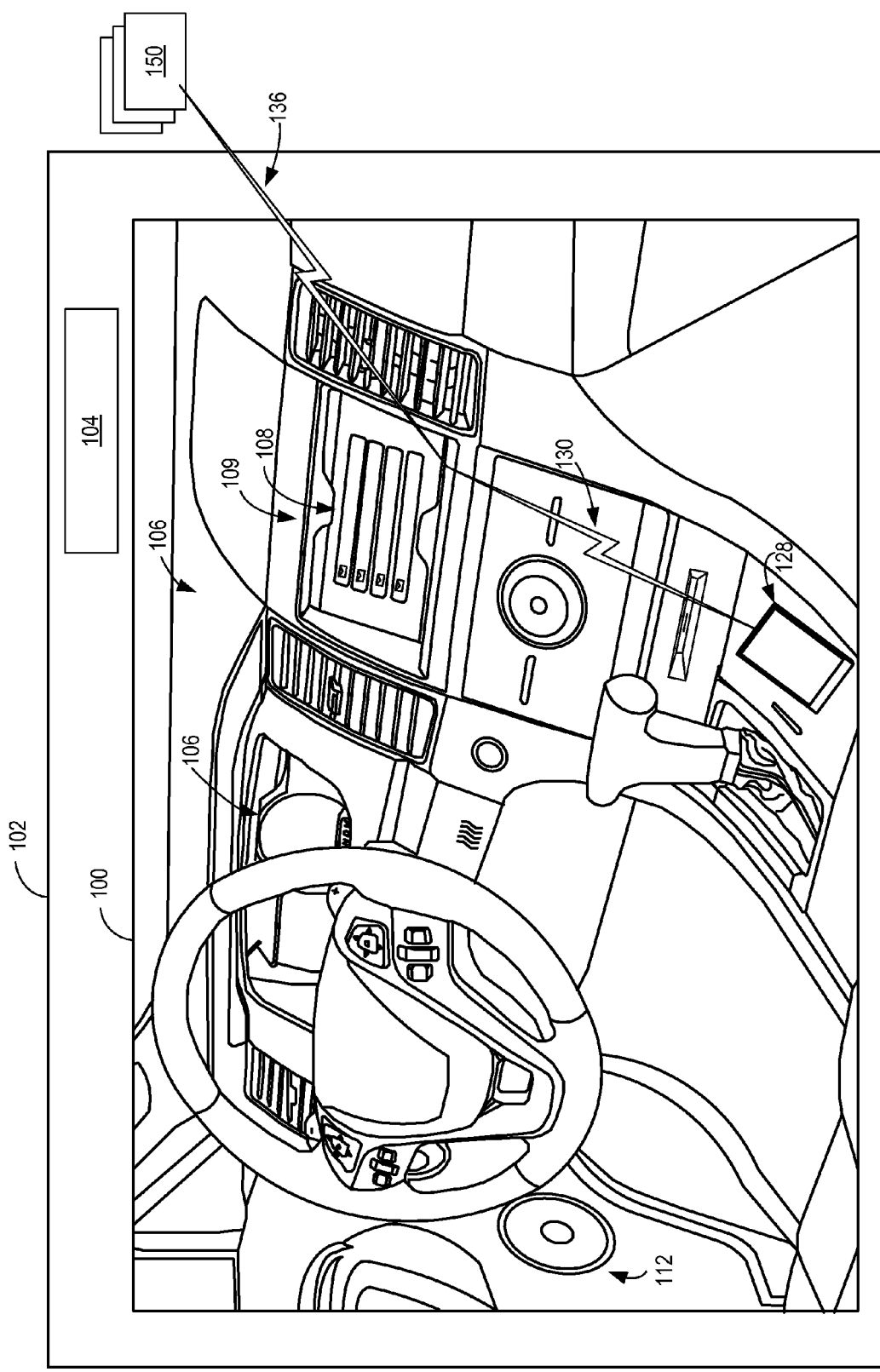
FIG. 1 shows an example partial view of a vehicle cabin in accordance with one or more embodiments of the present disclosure.

FIG. 1 shows an example partial view of one type of environment for a communication system: an interior of a cabin 100 of a vehicle 102, in which a driver and/or one or more passengers may be seated. Vehicle 102 of FIG. 1 may be a motor vehicle including drive wheels (not shown) and an internal combustion engine 104. Internal combustion engine 104 may include one or more combustion chambers which may receive intake air via an intake passage and exhaust combustion gases via an exhaust passage. Vehicle 102 may be a road automobile, among other types of vehicles. In some examples, vehicle 102 may include a hybrid propulsion system including an energy conversion device operable to absorb energy from vehicle motion and/or the engine and convert the absorbed energy to an energy form suitable for storage by an energy storage device. Vehicle 102 may include a fully electric vehicle, incorporating fuel cells, solar energy capturing elements, and/or other energy storage systems for powering the vehicle.

As shown, an instrument panel 106 may include various displays and controls accessible to a driver (also referred to as the user) of vehicle 102. For example, instrument panel 106 may include a touch screen 108 of an in-vehicle computing system 109 (e.g., an infotainment system), an audio system control panel, and an instrument cluster 110. While the example system shown in FIG. 1 includes audio system controls that may be performed via a user interface of in-vehicle computing system 109, such as touch screen 108 without a separate audio system control panel, in other embodiments, the vehicle may include an audio system control panel, which may include controls for a conventional vehicle audio system such as a radio, compact disc player, MP3 player, etc. The audio system controls may include features for controlling one or more aspects of audio output via speakers 112 of a vehicle speaker system. For example, the in-vehicle computing system or the audio system controls may control a volume of audio output, a distribution of sound among the individual speakers of the vehicle speaker system, an equalization of audio signals, and/or any other aspect of the audio output. In further examples, in-vehicle computing system 109 may adjust a radio station selection, a playlist selection, a source of audio input (e.g., from radio or CD or MP3), etc., based on user input received directly via touch screen 108, or based on data regarding the user (such as a physical state and/or environment of the user) received via external devices 150 and/or mobile device 128.

In some embodiments, one or more hardware elements of in-vehicle computing system 109, such as touch screen 108, a display screen, various control dials, knobs and buttons, memory, processor(s), and any interface elements (e.g., connectors or ports) may form an integrated head unit that is installed in instrument panel 106 of the vehicle. The head unit may be fixedly or removably attached in instrument panel 106. In additional or alternative embodiments, one or more hardware elements of the in-vehicle computing system may be modular and may be installed in multiple locations of the vehicle.

The cabin 100 may include one or more sensors for monitoring the vehicle, the user, and/or the environment. For example, the cabin 100 may include one or more seat-mounted pressure sensors configured to measure the pressure applied to the seat to determine the presence of a user, door sensors configured to monitor door activity, humidity sensors to measure the humidity content of the cabin, microphones to receive user input in the form of voice commands, to enable a user to conduct telephone calls, and/or to measure ambient noise in the cabin 100, etc. It is to be understood that the above-described sensors and/or one or more additional or alternative sensors may be positioned in any suitable location of the vehicle. For example, sensors may be positioned in an engine compartment, on an external surface of the vehicle, and/or in other suitable locations for providing information regarding the operation of the vehicle, ambient conditions of the vehicle, a user of the vehicle, etc. Information regarding ambient conditions of the vehicle, vehicle status, or vehicle driver may also be received from sensors external to/separate from the vehicle (that is, not part of the vehicle system), such as from sensors coupled to external devices 150 and/or mobile device 128.

Cabin 100 may also include one or more user objects, such as mobile device 128, that are stored in the vehicle before, during, and/or after travelling. The mobile device may include a smart phone, a tablet, a laptop computer, a portable media player, and/or any suitable mobile computing device. The mobile device 128 may be connected to the in-vehicle computing system via communication link 130. The communication link 130 may be wired (e.g., via Universal Serial Bus [USB], Mobile High-Definition Link [MHL], High-Definition Multimedia Interface [HDMI], etc.) or wireless (e.g., via BLUETOOTH, WI-FI, Near-Field Communication [NFC], cellular connectivity, etc.) and configured to provide two-way communication between the mobile device and the in-vehicle computing system. For example, the communication link 130 may provide sensor and/or control signals from various vehicle systems (such as vehicle audio system, climate control system, etc.) and the touch screen 108 to the mobile device 128 and may provide control and/or display signals from the mobile device 128 to the in-vehicle systems and the touch screen 108. The communication link 130 may also provide power to the mobile device 128 from an in-vehicle power source in order to charge an internal battery of the mobile device.

In-vehicle computing system 109 may also be communicatively coupled to additional devices operated and/or accessed by the user but located external to vehicle 102, such as one or more external devices 150. In the depicted embodiment, external devices 150 are located outside of vehicle 102 though it will be appreciated that in alternate embodiments, external devices may be located inside cabin 100. The external devices may include a server computing system, personal computing system, portable electronic device, electronic wrist band, electronic head band, portable music player, electronic activity tracking device, pedometer, smart-watch, GPS system, etc. External devices 150 may be connected to the in-vehicle computing system via communication link 136 which may be wired or wireless, as discussed with reference to communication link 130, and configured to provide two-way communication between the external devices and the in-vehicle computing system. For example, external devices 150 may include one or more sensors and communication link 136 may transmit sensor output from external devices 150 to in-vehicle computing system 109 and touch screen 108. External devices 150 may also store and/or receive information regarding contextual data, user behavior/preferences, operating rules, etc. and may transmit such information from the external devices 150 to in-vehicle computing system 109 and touch screen 108.

In-vehicle computing system 109 may analyze the input received from external devices 150, mobile device 128, and/or other input sources and select settings for various in-vehicle systems (such as climate control system or audio system), provide output via touch screen 108 and/or speakers 112, communicate with mobile device 128 and/or external devices 150, and/or perform other actions based on the assessment. In some embodiments, all or a portion of the assessment may be performed by the mobile device 128 and/or the external devices 150.

In some embodiments, one or more of the external devices 150 may be communicatively coupled to in-vehicle computing system 109 indirectly, via mobile device 128 and/or another of the external devices 150. For example, communication link 136 may communicatively couple external devices 150 to mobile device 128 such that output from external devices 150 is relayed to mobile device 128. Data received from external devices 150 may then be aggregated at mobile device 128 with data collected by mobile device 128, the aggregated data then transmitted to in-vehicle computing system 109 and touch screen 108 via communication link 130. Similar data aggregation may occur at a server system and then transmitted to in-vehicle computing system 109 and touch screen 108 via communication link 136/130.

In the example environment illustrated in FIG. 1, the in-vehicle computing system 109 may be connected to one or more vehicle systems, such as speakers 112, display 108, vehicle sensors, and/or other suitable vehicle systems via any suitable network. In some examples, the in-vehicle computing system 109 includes a talker device configured to transmit audio/video data to listener devices, such as speakers 112 and display 108 via a network. The network may be configured in accordance with Layer 2 of the Open Systems Interconnection (OSI) model, in which routing and forwarding decisions or determinations in the network may be performed on a media access control (MAC) addressing basis. An example Layer 2 network may be an Ethernet Audio/Video Bridging (AVB) network. For Layer 2 networks configured as AVB networks, the talkers and the listeners may be configured to communicate over the AVB network using various AVB standards and protocols, including the Institute of Electrical and Electronics Engineers (IEEE) 802.1AS-2011 (gPTP) for network timing and synchronization, IEEE 802.1Q-2011 clause 34 for queuing and forwarding streaming data, IEEE 802.1Q-2011 clause 35 (Stream Reservation Protocol (SRP)) for reserving a network connection or path and/or resources such as bandwidth for communication over the network connection, and/or IEEE 1722-2011 related to a possible data streaming format. Other AVB-related standards and protocols, and/or other versions of the AVB standards and protocols, previously, currently, or later developed, may also or alternatively be used.

The in-vehicle computing system may stream audio/video data based on information stored in local storage and/or audio/video data received from mobile device 128 and/or external device(s) 150. Transmitting audio/video data having a proper number of sample chunks within each packet may ensure that the audio/video data is presenting via the speakers 112 and/or display 108 at a proper media rate (e.g., without audio distortions that may arise from samples being skipped or played too early/late).

It is to be understood that FIG. 1 depicts one example environment, however the communication systems and methods described herein may be utilized in any suitable environment. As another example, speakers in a professional audio environment (e.g., an arena, stadium, concert hall, amphitheater, recording studio, etc.) may be utilized as listeners that receive audio data from a talker device (e.g., a mixing console, audio/video receiver, etc.) over an AVB network. Any suitable devices that transmit and/or receive packets may be utilized as the systems and/or to perform the methods described herein.

Figure 2:
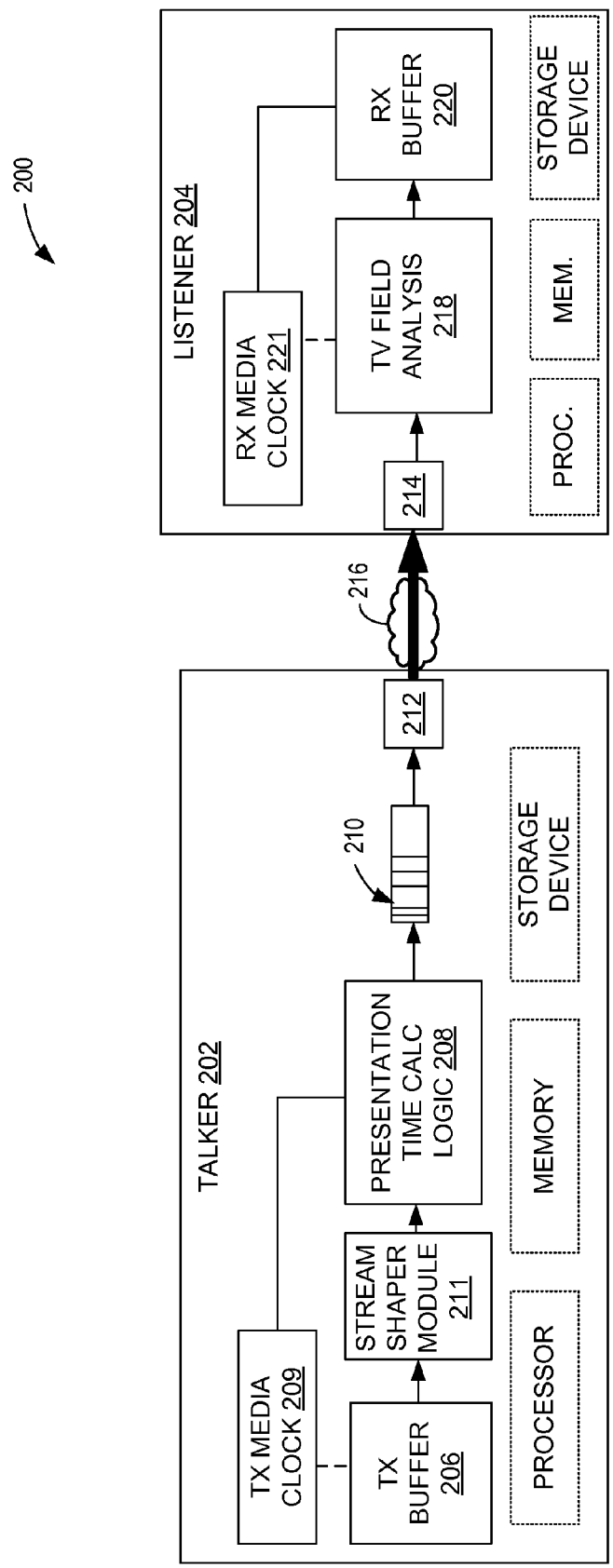
FIG. 2 shows an example communication system in accordance with one or more embodiments of the present disclosure.
Figure 3:
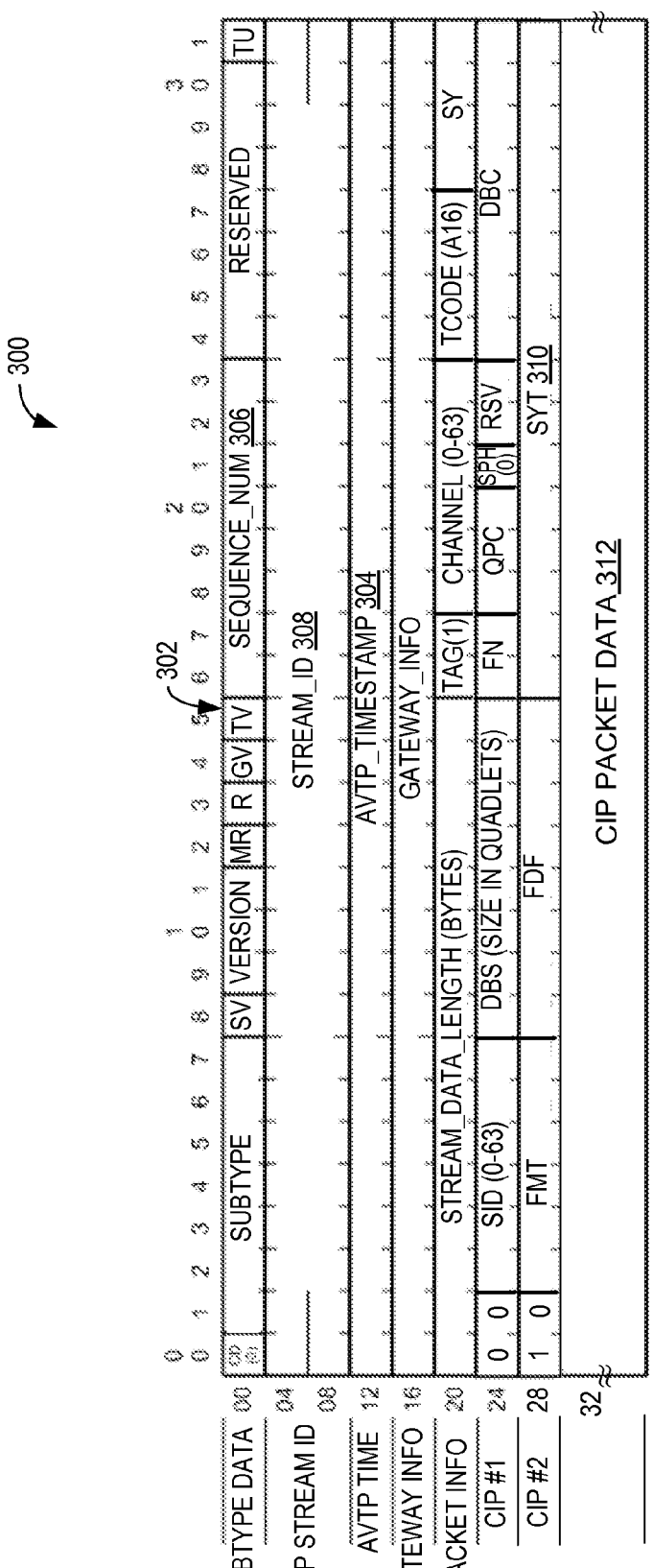
FIG. 3 shows an example packet structure in accordance with one or more embodiments of the present disclosure.

FIG. 2 is an example communication system 200 including a talker 202 and a listener 204. As described above, talker 202 may be any suitable device for sending an audio/video stream to listener 204 and listener 204 may be any suitable device for receiving and playing back the audio/video stream. For example, talker 202 may correspond to in-vehicle computing system 109 and listener 204 may correspond to speakers 112 and/or display 108 of FIG. 1. As illustrated, talker 202 may include a transmission buffer 206 configured to store data blocks of an audio/video stream. For example, if the audio/video stream is supplied from an external device (e.g., external device 150 and/or mobile device 128 of FIG. 1), the received data may be stored in transmission buffer 206 until the data is ready to be processed by a stream shaper module 211 and a presentation time calculation logic 208. A stream shaper module 211 (e.g., in combination with the presentation time calculation logic 208 and/or another suitable module of talker 202, such as a packetizer, communication interface 212, etc.) may encapsulate one or more samples in a packet 210 including header information indicating a presentation time and a validity of the presentation time. An example packet structure is illustrated in FIG. 3 and described in more detail below. The number of sample chunks to be included in the packet may be calculated by the stream shaper module for each iteration (e.g., for each packet formed by the stream shaper module) in accordance with a plurality of parameters. An example method of calculating the number of sample chunks is described below with respect to FIG. 4.

Once the number of sample chunks to be included in the packet is calculated for the packet, the presentation time may be calculated and/or verified by presentation time calculation logic 208. Presentation time calculation logic 208 may be a module including instructions executable by a processor of talker 202 for determining if a sample received from transmission buffer 206 is to include a data block with a valid presentation time stamp, and, if so, calculating the presentation time for that data block and setting a timestamp_valid field to 1 (and/or another suitable value to indicate that the presentation time in that packet is valid). The presentation time may be calculated based on a clock signal from transmission media clock 209. Methods for determining whether to include a valid presentation time and calculating the presentation time are described below with respect to FIGS. 5 and 6.

The packet 210 may be transmitted from talker 202 (e.g., via a talker communication interface 212) to a listener 204 (e.g., via a listener communication interface 214) over a network (e.g., an AVB network 216). Accordingly, talker communication interface 212 and listener communication interface 214 may be configured to communicate via an AVB network (e.g., via the audio/video transport protocol, AVTP). Packet 210, as received at listener 204, may be provided to a timestamp_valid (TV) field analysis module 218. TV field analysis module 218 may include instructions executable by a processor of listener 204 to evaluate the header of received packets (e.g., of packet 210) to determine a value of a timestamp_valid field. If the timestamp_valid field is set to 1 or another suitable value indicating that the presentation time included in that packet is valid, the packet is stored at receive buffer 220 in an index that is based on the presentation time included in the packet. Otherwise, the presentation time may be ignored for that packet. In such examples, the packet may be stored at an index that is selected based on a last received valid presentation time (e.g., a next empty index). Additionally or alternatively, the packet may be discarded and/or stored in a default location in the receive buffer 220 responsive to a determination that the presentation time included in the header for that packet is not valid. The listener 204 may play out audio/video data from receive buffer 220 based on the index at which each data block is stored and/or when a receive media clock 221 of the listener reaches the presentation time indicated for a given data block.

In some examples, the presentation time may be utilized to synchronize the receive media clock 221 with the transmission media clock 209. For example, if the network delay (e.g., the max transit time) is known by both the talker and the listener, the listener may compare a receive time with an expected receive time (e.g., based on a known transmission delay and the presentation time) and adjust the receive media clock based on a calculated error (e.g., the difference between the measured receive time and the expected receive time).

It is to be understood that one or more of the components of talker 202 and listener 204 may include and/or be included in a processor and/or storage device of talker 202 and listener 204. For example, although a processor/memory/storage device is illustrated separately within talker 202 and listener 204, it is to be understood that transmission buffer 206 may include at least a portion of a storage device of talker 202, and presentation time calculation logic 208 may include instructions stored in the storage device of talker 202 and/or a processor for executing the instructions stored in the storage device of talker 202. Likewise, receive buffer 220 may include at least a portion of a storage device of listener 204, and TV field analysis module 218 may include instructions stored in the storage device of listener 204 and/or a processor for executing the instructions stored in the storage device of listener 204.

FIG. 3 illustrates an example packet 300 including a timestamp_valid field (e.g., "TV" field 302) and a presentation time (e.g., AVTP_TIMESTAMP field 304). For example, packet 300 may illustrate an example structure of packet 210 of FIG. 2. Other fields of note may include the SEQUENCE_NUM field 306, which may indicate a place of the packet in the audio/video stream (e.g., how many packets were sent before that packet in the current audio/video stream). STREAM_ID field 308 may indicate an identifier for the stream, which designates the stream to which the packet belongs. As described above, AVTP_TIMESTAMP field 304 indicates a time at which the packet is to be played back (e.g., a real time and/or a time that is reachable by a media clock of a listener). SYT field 310 may indicate a SYT_INTERVAL, which denotes the number of data blocks between two successive valid AVTP_TIMESTAMP fields. CIP PACKET DATA field 312 may include the payload of the packet (e.g., while each of the other fields illustrated in FIG. 3 and/or described above make up the header of the packet). For example, CIP PACKET DATA field 312 may include the audio/video data blocks/samples to be played back at the time indicated in the AVTP_TIMESTAMP field 304. The number of sample chunks in the CIP PACKET DATA field 312 may be determined based on a calculation as described below with respect to FIG. 4.

Figure 4:
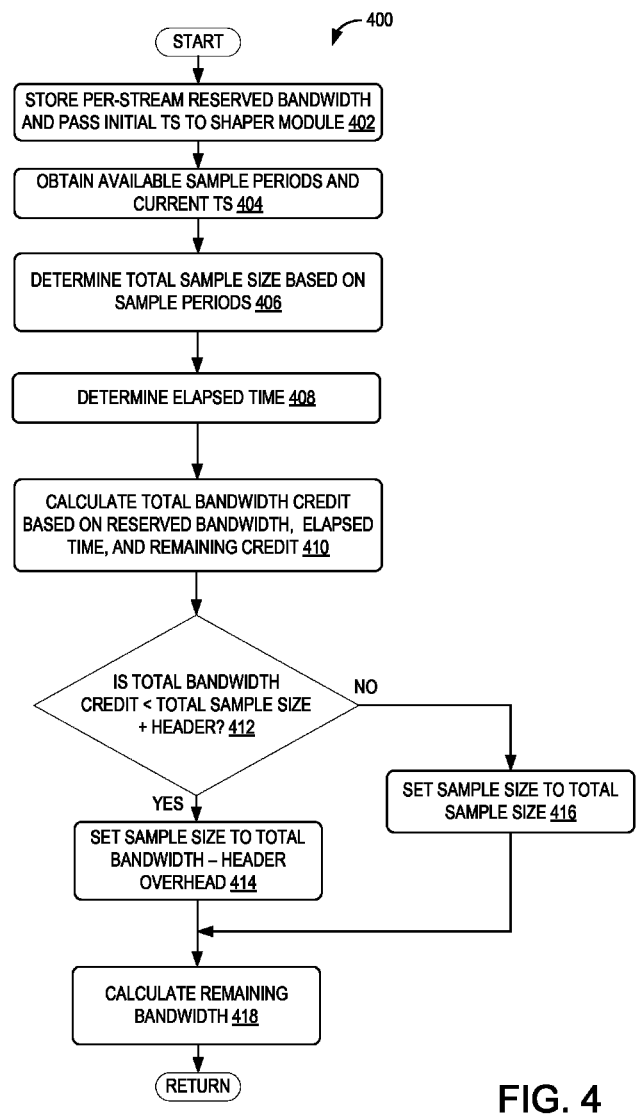
FIG. 4 is a flow chart for an example method of determining a number of sample blocks to be included in a generated packet.

FIG. 4 is a flow chart of a method 400 for determining a number of sample chunks to include in a packet. For example, method 400 may be performed at each iteration or interval at which a packet is generated at a talker device for transmission to a listener device. Method 400 may be performed by any suitable transmission device, such as talker 202 of FIG. 2. At 402, method 400 includes storing a per-stream reserved bandwidth and passing an initial timestamp to a shaper module (e.g., shaper module 211 of FIG. 2. Other parameters, such as a number of stream channels on which data is to be sent, may be passed. The initial timestamp may be a timestamp sent during an immediately prior (e.g., a last-performed) iteration of the method. The shaper module may store these values with an indication of the stream context. At 404, the method includes obtaining available sample periods and a current timestamp designated for that interval. During each successive call to the shaper module (e.g., for each iteration or interval of the method), the number of available samples (e.g., the sample periods) and the current timestamp is passed to the shaper module.

Based on the parameters passed to the shaper module (e.g., the sample periods), the method includes determining a total sample size, as indicated at 406. The total sample size may be determined in bytes and indicate an amount of data available to be transmitted (e.g., an amount of data received from a data source. A total size of data to be sent may be determined to be the sum of the total sample size and a header overhead (e.g., the byte size of a header to be appended to the packet).

At 408, method 400 includes determining an elapsed time based on the timestamp passed during this iteration (e.g., at 404) and a previous timestamp passed during the previous iteration (e.g., as stored at 402 and/or during a last iteration). At 410, the method includes calculating a total bandwidth credit based on the reserved bandwidth (e.g., as stored at 402) and the elapsed time (e.g., as determined at 410). For example, the bandwidth credit for the current iteration may be equal to the product of the reserved bandwidth and the elapsed time divided by 1000000000 (e.g., $1*10^9$). The total calculated bandwidth credit may be equal to the sum of the bandwidth credit for the current iteration and the bandwidth remaining from a last iteration.

At 412, the method includes determining if the total bandwidth credit (e.g., as calculated at 410) is less than a sum of the total sample size (e.g., as determined at 406) and the header overhead for the packet. If not (e.g., "NO" at 412), the bandwidth credit is large enough to send all available data. Accordingly, the method proceeds to 414 to set the sample size as the total sample size. If the calculation of the total sample size included an addition of the header overhead, the sample size is calculated as the total sample size minus the header overhead.

Alternatively, if the total bandwidth credit is less than the sum of the total sample size and the header overhead (e.g., "YES" at 412), then the available bandwidth may not be large enough to accommodate all of the available sample data, and the method proceeds to 416 to set the sample size as the total bandwidth credit minus the header overhead. The sample size for the packet, as set at either 414 or 416, may be converted from a byte size to a number of sample blocks in order to determine the actual number of blocks to be included in the current packet being generated. The generated packet may then be transmitted from the talker device to one or more listener devices.

At 418, the method includes calculating the remaining bandwidth and storing the current timestamp. The remaining bandwidth is equal to the total bandwidth credit (e.g., as calculated at 410) minus the sample size for the current packet (e.g., as set at 414 or 416) and minus the header overhead. In this way, the remaining bandwidth represents a bandwidth credit to be carried over to a next iteration of the method. For example, if the sample size was set as the bandwidth credit−header overhead, all of the bandwidth credit may be used for transmission and no bandwidth credit may be left over for use in a next iteration. In an alternative example where the sample size is set as the total size at 414, the sample size may be less than the bandwidth credit, such that additional bandwidth is able to be carried over to a next iteration. The current timestamp may be stored for use as the initial timestamp at 402 in a next iteration of the method and/or as the prior timestamp utilized in calculating an elapsed time at 408 in the next iteration of the method.

An example application of method 400 follows. For an example transmission traffic class A in an AVB network, the transmit/receive rate may be equal to 8000 packets/second, the sample rate may be equal to 48 kHz for audio data, and the SYT_INTERVAL may be set to 8 (e.g., a maximum of 8 samples may be included in a single packet. Further, a timing interval may be equal to 125 µs and a header overhead may be defined by relevant communication specifications, and equal to an Ethernet overhead (e.g., 42 bytes) plus a 1722 header overhead (e.g., 32 bytes), totaling 74 bytes in this example. A sample rate of 48 kHz indicates that 48000 sample blocks are to be transmitted within one second (e.g., within 8000 packets in this example) in order to minimize distortion in playback. Accordingly, when evenly distributed, each packet may carry 48000/8000, or 6 sample blocks, where each sample block includes all samples that are captured for the same event and/or at the same time. For example, if each sample captured by the data source is 4 bytes in size, and if the data source provides a stereo stream of audio data, one sample block may include a sample (4 bytes of data) for a left channel and a sample (4 bytes of data) for a right channel, creating a sample block having 8 bytes of data. For 6 sample blocks (e.g., the amount of sample blocks in each packet of this example when evenly distributed), each packet will include 48 bytes of data in the sample data portion of the packet (e.g., CIP packet data 312 of FIG. 3). As each packet will also include header overhead, the total packet size is the sum of the bytes in the sample blocks (e.g., 48 bytes in the above example) and the headers (e.g., 74 bytes in the above example). For this example, each packet (e.g., each iteration of transmission) will include 122 bytes of data. As the transmission rate is 8000 packets/second, the reserved (e.g., per stream) bandwidth may equal 8000*122, or 976000 bytes/second.

Using the parameters in the example scenario above, a plurality of example iterations of method 400 of FIG. 4 may be performed as follows. During a first example iteration, a number of blocks available to send is equal to a bandwidth credit available for sending the blocks. For example, a previous timestamp (e.g., a time of a previous iteration of the method) may be 125000 µs and a current timestamp is 250000 µs. The total sample size in bytes is 6 samples*8 bytes/sample, which equals 48 bytes, while the header overhead is 74 bytes. Thus, the total sample size is 48 bytes and the total packet size for carrying the samples is 122 bytes (total sample size plus header overhead). The elapsed time is 250000−125000, which equals 125000 µs. The bandwidth credit is the reserved bandwidth (indicated above as 976000 bytes/second) multiplied by the elapsed time (125000 µs) divided by $1*10^9$, which equals 122 bytes. Since the bandwidth credit (122 bytes) is not less than the total sample size plus the header overheads (122 bytes), then the to-be-sent sample size (also referred to herein as send sample size) is set to the total sample size, or 122 bytes. Converting the to-be-sent sample size into sample blocks results in the determination that 6 sample blocks are to be sent ([send sample size−header overhead]/bytes per block). A calculation of the remaining bandwidth is performed by subtracting the send sample size and the header overhead from the bandwidth credit. Thus, for this example, the remaining bandwidth is 0, and no bandwidth is carried over to a next iteration.

A second example iteration may be performed in a scenario where the total size of the available sample blocks to be sent is lower than the bandwidth credit, resulting in a remaining credit to be carried over to a next iteration. For example, if only 4 sample blocks are available to be sent (e.g., only 4 sample blocks are stored in a transmission buffer), the total sample size is 4 sample blocks*8 bytes/sample block, or 32 bytes total. The header is 74 bytes, yielding a total size of the packet equal to 106 bytes. If a previous timestamp is 250000 µs and a current timestamp is 375000 µs, an elapsed time is 125000 µs. Accordingly, a bandwidth credit for this iteration is (976000*125000)/$1*10^9$=122 bytes. If this example iteration occurs immediately after the first example iteration, the total bandwidth credit is equal to the bandwidth credit for this iteration, since no bandwidth remained after performing the first iteration. Since the total bandwidth (122 bytes) is greater than the total packet size (106 bytes), the sample size is set to the total size (106 bytes), and the send sample size is equal to 106 (total packet size)−74 (header overhead)=32 bytes, or 4 sample blocks. The remaining bandwidth is equal to the bandwidth credit (122 bytes) minus the total packet size (e.g., the send sample size of 32 bytes and the header overhead of 74 bytes), which equals 16.

A third example iteration may be performed in a scenario where the total size of the available sample blocks to be sent is greater than the total bandwidth credit. For example, if 10 sample blocks are available to be sent, the total sample size is 10*8=80 bytes, and the header overhead is 74 bytes. Accordingly, the total size of data to be sent equals 154 bytes. If the previous timestamp is 375000 µs and the current timestamp is 500000 µs, the elapsed time is equal to 125000 µs. Accordingly, the bandwidth credit for this iteration is 122 bytes, as described in the above examples. Further, as this third example iteration occurs after the second example iteration, the total bandwidth credit includes the carryover bandwidth from the second iteration (e.g., 16 bytes). Thus, the total bandwidth credit in this example iteration is 122+16, or 138 bytes. However, since the total bandwidth is less than the total sample size plus the header overhead (e.g., since 138 is less than 154), the sample size for this packet is set to the total bandwidth credit minus the header overhead to ensure that the packet is able to be transmitted without exceeding the available bandwidth. Therefore, the sample size for this packet is set to 138−74, or 64 bytes, which equals 8 sample blocks. Accordingly, the packet that is transmitted includes only a number of sample blocks equal to the sample size (e.g., only 8 blocks in this example) and does not include the other two sample blocks saved in the transmission buffer. In other words, only the number of sample blocks equal to the sample size are transmitted in the packet and any other sample blocks (e.g., any other sample blocks in the transmission buffer) are not transmitted in the packet. As all of the bandwidth is utilized, no bandwidth is carried over to a next iteration and two sample blocks remain in the transmission buffer for transmission in a next packet. It is to be understood that the example iterations and scenarios described above include values provided for exemplary purposes and any suitable parameters may be utilized without departing from the scope of this disclosure.

Figure 5:
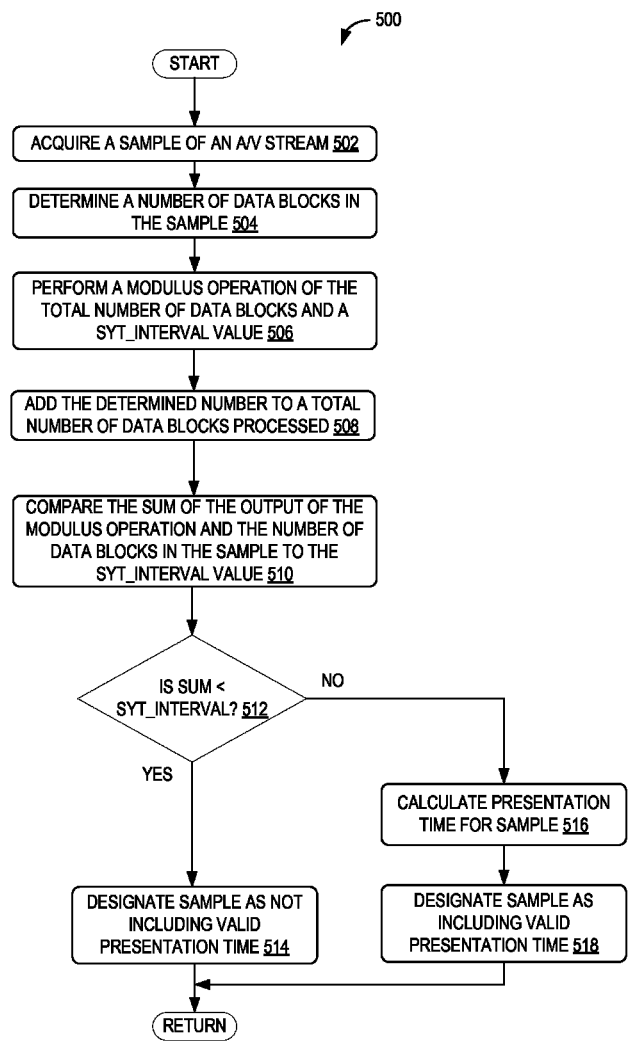
FIG. 5 is a flow chart for an example method of determining which samples are to include valid presentation time stamps in accordance with one or more embodiments of the present disclosure.

After determining a number of samples to be included in a packet, the talker may determine whether the packet is to include a valid presentation time. FIG. 5 is a flow chart of a method 500 for determining whether a packet is to include a valid presentation time. For example, method 500 may be performed by talker 202 (e.g., by presentation time calculation logic 208) of FIG. 2. At 502, method 500 includes acquiring a sample of an audio/video stream. A talker may be configured to sample data at a particular rate and transmit data at a particular rate (e.g., based on a class of traffic for that talker/the network over which the talker communicates). Accordingly, a sample of an audio/video stream that is to be transmitted may include all data associated with a sample period (e.g., all channels of audio/video data that were captured during the sample period and that are associated with events that occurred during the time that is captured by the sample period). At 504, method 500 includes determining a number of data blocks in the sample. A data block may include all data associated with events that happened at a particular instant in time, thus the number of data blocks may vary based on the length of the sample period (which may be based on the sampling rate/traffic class, as described above). For example, at a 48 kHz sample rate and a Class A transmit rate, a given sample may include 6 data blocks. In order to determine the number of data blocks in the sample, the system may perform all or a portion of method 400 as described above with respect to FIG. 4.

At 506, method 500 includes performing a modulus operation of a total number of data blocks (e.g., a total number of data blocks included in all previously acquired samples of the audio/video stream) and a SYT_INTERVAL value. As described above, the SYT_INTERVAL value may indicate the number of data blocks between two successive valid AVTP_TIMESTAMP fields (e.g., between two successive presentation time designations). Using the example of 48 kHz of class A traffic described above, the SYT_INTERVAL value would be 8, meaning that every $8^{th}$ data block has a valid timestamp associated thereto. In another example, class B traffic may have a SYT_INTERVAL of 64, meaning that every $64^{th}$ data block has a valid timestamp associated thereto. At 508, method 500 includes adding the number of data blocks in the sample to a total number of data blocks processed for that stream.

Performing the modulus operation indicated at 506 enables the determination of whether a valid presentation time is to be included for the acquired sample by comparing the sum of the output of the modulus operation and the number of data blocks in the sample to the SYT_INTERVAL value, as indicated at 510. Method 500 includes determining if the sum of the output of the modulus operation and the number of data blocks in the sample is less than the SYT_INTERVAL, as indicated at 512. If the sum is less than the SYT_INTERVAL ("YES" at 512), the method proceeds to 514 to designate the sample as not including a valid presentation time. For example, an AVTP_TIMESTAMP_VALID (TV) field of a packet including the sample may be set to 0 to indicate that any timestamp for that packet is not a valid presentation time and the presentation time may not be calculated for that packet. Conversely, if the sum is greater than or equal to the SYT_INTERVAL ("NO" at 512), the method proceeds to 516 to calculate a presentation time for the sample. After calculating the presentation time for the sample, the method proceeds to 518 to designate the sample as including a valid presentation time. For example, an AVTP_TIMESTAMP_VALID (TV) field of a packet including the sample may be set to 1 to indicate that the timestamp for that packet (e.g., the AVTP_TIMESTAMP field in the head of that packet) is a valid presentation time.

Figure 6:
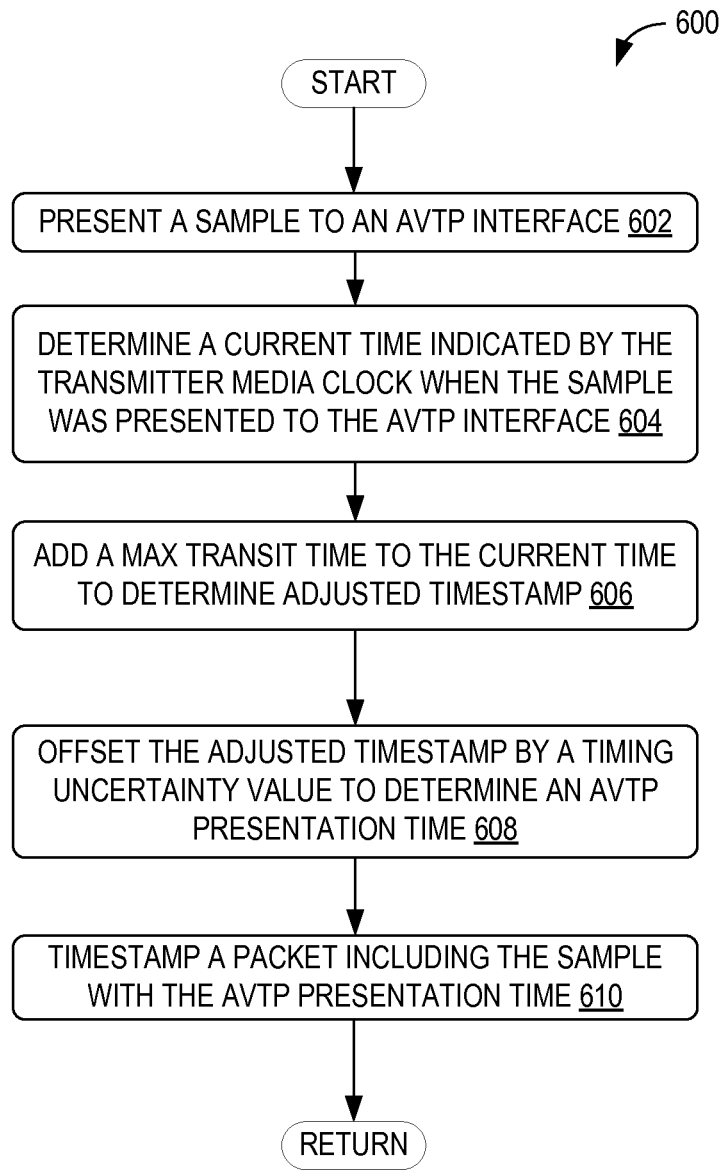
FIG. 6 is a flow chart for an example method of determining a presentation time stamp in accordance with one or more embodiments of the present disclosure.

FIG. 6 is a flow chart for a method 600 for calculating a presentation time for a sample. At 602, the method includes presenting a sample to an AVTP interface. For example, the AVTP interface may include transmitter communication interface 212 of FIG. 2. At 604, the method includes determining a current time indicated by a transmitter media clock when the sample was presented to the AVTP interface. For example, a clock signal from transmitter media clock 209 of FIG. 2 may be utilized to determine a local time at which the sample was presented to the AVTP interface. At 606, method 600 includes adding a max transit time to the current time to determine an adjusted timestamp. In some embodiments, the max transit time may include a worst case delay based on the communication network and/or the communication link(s) between the talker and the listener(s) for a given audio/video stream. In some examples, the worst case delay may be a longest delay in the network/to a listener based on current traffic, historical data, user settings, etc.

At 608, method 600 includes offsetting the adjusted timestamp by a timing uncertainty value to determine an AVTP presentation time. In some examples, a timing uncertainty value may be provided for a given audio/video stream and/or defined for a talker/listener/network/etc. At 610, the method includes time stamping a packet including the sample with the determined AVTP presentation time. For example, the AVTP_TIMESTAMP field 304 of FIG. 3 may include this determined AVTP presentation time. As described above with respect to FIG. 5, the presentation time may only be determined responsive to determining that the sample has a valid timestamp associated therewith. For example, method 600 may be performed at 516 of FIG. 5.

The electronic devices that communicate data streams in the above-described examples may first establish a reservation for the data stream communication. Upon startup, the devices may attain a link status, which enables the devices to communicate with peer nodes or devices in the system. After link status is attained, the devices may be initialized with a reservation protocol. For Audio-Video Bridging networks, the reservation protocol may be Stream Reservation Protocol (SRP). The initialization process may include a domain negotiation in which domain packets may be communicated with peer nodes. After the initialization process is performed, the devices may establish a reservation for the data stream communication. The reservation may be a reservation for a network path through the network and/or for network resources such as bandwidth, which may be guaranteed during communication of the data stream. Where a reservation protocol is used, messages may be communicated between the talkers and the listeners (e.g., through bridges) in accordance with the reservation protocol to establish the reservation. Once the reservation is established, the data stream may be communicated over the network. By determining a number of sample blocks to be included in each packet as described above, the system is able to ensure that the reservation is not exceeded, and that the number of samples that are sent to the listener device allows for a minimization of distortion during playback.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the in-vehicle computing system 109 and/or talker 202/listener 204 described with reference to FIGS. 1 and 2. The methods may be performed by executing stored instructions with one or more logic devices (e.g., processors) in combination with one or more additional hardware elements, such as storage devices, memory, hardware network interfaces/antennas, clock circuits, etc. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The following claims particularly point out subject matter from the above disclosure that is regarded as novel and non-obvious.

The invention claimed is:

1. A device comprising:
a communication interface communicatively connectable to another device and configured to transmit data;
a processor; and
a storage device that stores instructions executable by the processor to:
in a first, current cycle:
determine a total sample size of samples stored in a transmission buffer;
calculate a bandwidth credit for the current cycle based on a reserved bandwidth and an elapsed time since a last sent packet, where the last sent packet was sent in a second, previous cycle immediately prior to the current cycle;
determine a number of sample blocks to include in a packet for the current cycle based on the total sample size and the bandwidth credit;
generate the packet for the current cycle including the determined number of sample blocks; and
transmit, to a listener device, the packet for the current cycle including the determined number of sample blocks, wherein the packet is one of a plurality of generated packets; and
wherein the instructions are executable to dynamically calculate an updated number of sample blocks to be included in transmitted packets for each of a plurality of cycles by determining, at each interval at which a packet is generated at the device, the number of sample blocks to be included in one of the plurality of generated packets.

2. The device of claim 1, wherein the instructions are further executable to store a prior timestamp corresponding to a last generated packet generated in the previous cycle and a current timestamp for the current cycle, the elapsed time being equal to a difference between the prior timestamp and the current timestamp, and wherein the sample blocks are included in a payload field of the generated packet and a presentation time is included in a header of the generated packet, the presentation time indicating a time at which the sample blocks are to be played out.

3. The device of claim 1, wherein the bandwidth credit is calculated by determining a product of the reserved bandwidth and the elapsed time to determine a current bandwidth credit.

4. The device of claim 3, wherein the bandwidth credit is equal to a sum of the current bandwidth credit for the current cycle and a remaining bandwidth credit calculated for a last transmitted packet transmitted during the previous cycle.

5. The device of claim 4, wherein the instructions are further executable to calculate and store a remaining bandwidth to be carried over to a third, successive cycle for determining a sample size of a next generated packet, the remaining bandwidth being equal to a difference between the bandwidth credit and a sum of:
a size of the number of sample blocks included in the generated packet, and
a header of the generated packet.

6. The device of claim 1, wherein the instructions are further executable to determine whether the bandwidth credit is less than a threshold, the threshold being equal to a sum of the total sample size and a header overhead, the header overhead being the size of a header of the generated packet.

7. The device of claim 6, wherein the instructions are further executable to set a send sample size to a difference between the bandwidth credit and the header overhead if the bandwidth credit is less than the sum of the total sample size and the header overhead.

8. The device of claim 7, wherein the instructions are further executable to set the send sample size to the total sample size if the bandwidth credit is not less than the sum of the total sample size and the header overhead.

9. The device of claim 1, wherein the device is a talker device in an Ethernet AVB network, the instructions further executable to transmit the generated packet to the listener device in the Ethernet AVB network.

10. A communication system comprising:
a talker device including:
a transmission buffer for storing audio/video data blocks for transmission, and
a stream shaper module including instructions executable by a processor of the talker device to determine a sample size for a packet based on a total sample size of data blocks in the transmission buffer and a bandwidth credit, to convert the sample size from a byte size to a number of sample blocks to be included in the packet, and to generate the packet including the number of sample blocks in a payload field of the generated packet and including a presentation time in a header of the generated packet, the presentation time indicating a time at which the sample blocks are to be played out, where, during each successive call to the stream shaper module, a number of available samples and a current timestamp is passed to the stream shaper module to dynamically calculate an updated number of sample blocks to be included in transmitted packets for each of a plurality of iterations; and
a listener device communicatively connected to the talker device and configured to receive the generated packet from the talker device.

11. The system of claim 10, wherein the bandwidth credit is calculated by determining a product of a reserved bandwidth and an elapsed time and dividing the product by $1*10^9$ to determine a current bandwidth credit.

12. The system of claim 11, wherein the bandwidth credit is equal to a sum of the current bandwidth credit and a remaining bandwidth credit calculated for a last transmitted packet.

13. The system of claim 12, wherein the instructions are further executable to store a prior timestamp corresponding to a last generated packet and a current timestamp, the elapsed time being equal to a difference between the prior timestamp and the current timestamp.

14. The system of claim 13, wherein the instructions are further executable to calculate and store a remaining bandwidth for a next generated packet, the remaining bandwidth being equal to a difference between the bandwidth credit and a sum of:
- a size of the number of sample blocks included in the generated packet, and
- the header of the generated packet.

15. The system of claim 10, wherein the instructions are further executable to determine whether the bandwidth credit is less than a threshold, the threshold being equal to a sum of the total sample size and a header overhead, the header overhead being the size of the header of the generated packet.

16. The system of claim 15, wherein the instructions are further executable to set a send sample size to a difference between the bandwidth credit and the header overhead if the bandwidth credit is less than the sum of the total sample size and the header overhead, the talker device further comprising an interface adapted to transmit the generated packet to the listener device.

17. The system of claim 16, wherein the instructions are further executable to set the send sample size to the total sample size if the bandwidth credit is not less than the sum of the total sample size and the header overhead.

18. A method for determining a number of sample blocks to include in packets of an audio/video stream transmitted from a talker device to a listener device, the method comprising, for a first, current cycle:
- determining a total sample size of data in a transmission buffer of the talker device;
- determining an elapsed time between a timestamp of a prior generated packet generated during a second, previous cycle immediately prior to the current cycle and a current timestamp for the current cycle;
- calculating a total bandwidth credit based on a reserved bandwidth and the elapsed time;
- dynamically calculating an updated number of sample blocks to be included in transmitted packets for each of a plurality of cycles by determining, at each interval at which a packet is generated at the talker device, a number of sample blocks to be included in the packet to be generated at that interval based on the total bandwidth credit and the total sample size at that interval;
- generating the packet including the determined number of sample blocks in a payload field of the generated packet and a presentation time in a header of the generated packet, the presentation time indicating a time at which the sample blocks are to be played out at the listener device; and
- transmitting the generated packet including the determined number of sample blocks.

19. The method of claim 18, wherein the header includes a number of bytes equal to a header size, the method further comprising determining whether the total bandwidth credit is less than a sum of the total sample size and the header size.

20. The method of claim 19, wherein the number of sample blocks is set to a difference between the total bandwidth credit and the header size if a total bandwidth is less than the sum of the total sample size and the header size, and wherein the number of sample blocks is set to the total sample size if the total bandwidth is not less than the sum of the total sample size and the header size.

* * * * *